(12) United States Patent
Barnard et al.

(10) Patent No.: US 10,526,874 B2
(45) Date of Patent: Jan. 7, 2020

(54) DEPOSITED MATERIAL SAND CONTROL MEDIA

(71) Applicant: Baker Hughes Incorporated, Houston, TX (US)

(72) Inventors: Jason J. Barnard, Katy, TX (US); Chance Ethan Mann, Magnolia, TX (US); Steve M. Winnon, Conroe, TX (US); Shay Hetz, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 582 days.

(21) Appl. No.: 15/041,823

(22) Filed: Feb. 11, 2016

(65) Prior Publication Data

US 2016/0237791 A1 Aug. 18, 2016

Related U.S. Application Data

(60) Provisional application No. 62/117,225, filed on Feb. 17, 2015.

(51) Int. Cl.
| | |
|---|---|
| *E21B 43/08* | (2006.01) |
| *B22F 3/105* | (2006.01) |
| *B22F 7/06* | (2006.01) |
| *B22F 5/10* | (2006.01) |
| *B33Y 10/00* | (2015.01) |
| *B33Y 80/00* | (2015.01) |
| *B22F 5/00* | (2006.01) |

(52) U.S. Cl.
CPC .......... *E21B 43/082* (2013.01); *B22F 3/1055* (2013.01); *B22F 5/10* (2013.01); *B22F 7/062* (2013.01); *B22F 2005/005* (2013.01); *B33Y 10/00* (2014.12); *B33Y 80/00* (2014.12); *Y02P 10/295* (2015.11)

(58) Field of Classification Search
CPC ...... E21B 43/082; E21B 43/08; E21B 43/086; Y02P 10/295; B22F 3/1055; B22F 2005/005; B22F 5/10; B22F 7/062; B33Y 10/00; B33Y 80/00
See application file for complete search history.

(56) References Cited

U.S. PATENT DOCUMENTS

| | | | |
|---|---|---|---|
| 5,387,380 A | 2/1995 | Cima et al. | |
| 2007/0183919 A1* | 8/2007 | Ayer | B22F 3/1125 419/2 |
| 2008/0006402 A1* | 1/2008 | Russell | E21B 43/082 166/229 |
| 2008/0217002 A1* | 9/2008 | Simonds | E21B 43/084 166/230 |
| 2009/0065206 A1* | 3/2009 | Russell | E21B 43/082 166/276 |
| 2011/0067872 A1* | 3/2011 | Agrawal | E21B 43/082 166/302 |

* cited by examiner

*Primary Examiner* — Robert E Fuller
*Assistant Examiner* — Christopher J Sebesta
(74) *Attorney, Agent, or Firm* — Shawn Hunter

(57) ABSTRACT

A filtering medium for removal of solids from a fluid. A solid filtering matrix contains fluid passages that are made up of a plurality of chambers with connecting channels. The chambers have a greater diameter than the connecting channels.

10 Claims, 8 Drawing Sheets

DEPOSITED MATERIAL SAND CONTROL MEDIA

BACKGROUND OF THE INVENTION

1. Field of the Invention

The invention relates generally to filtering media used for sand control during hydrocarbon production from a wellbore. In particular aspects, the invention relates to designs for and methods of creating sand control filtering media.

2. Description of the Related Art

During production of hydrocarbon fluids, debris and other small solids (typically referred to as "sand") are undesirably carried along with the desired fluid. Sand control screens have been used to try to control sand by preventing it from entering the production flow to the surface. Sand control screens typically radially surround a production nipple.

Plugs having bonded metal bead filtering media are also known. The inventors believe, however, that many bonded bead designs are more prone to clogging.

SUMMARY OF THE INVENTION

The present invention provides sand filtering media that features a solid matrix within which are fluid pathways that are preferably made up of substantially spherical chambers and connecting channels which extend between neighboring chambers. In preferred embodiments, the connecting channels have a smaller diameter than the diameter of the chambers. In currently preferred embodiments, a channel has a diameter that is a fraction of the diameter of the chamber. It is contemplated that different chambers and channels could be provided that have a variety of different diameters. The diameters or the chambers and channels may vary anisotropically or even be random. Passage of fluid through sequential chambers and channels causes solid matter to be removed.

In preferred embodiments, filtering plugs are described that can be removably disposed within openings in a production nipple. The filtering plugs are preferably threaded and shaped and sized to be threadedly inserted into complementary openings in the housing of the production nipple. According to alternative embodiments, filtering plugs are press fit into the openings. In particular embodiments, individual fluid pathways through the plug are arranged in a largely helical pattern starting proximate the radial center of the plug and radiating outwardly toward the outer circumference of the plug.

According to preferred embodiments, sand filtering media is created using additive manufacturing technology to form a solid filtering matrix. Powder bed additive manufacturing might be used. In described embodiments, a 3D printing device is used to create a filtering medium by depositing sequential layers of solid material which will form a filtering matrix. It is highly preferred that the material used to form the matrix be metal. In currently preferred embodiments, the filtering matrix is formed of stainless steel.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
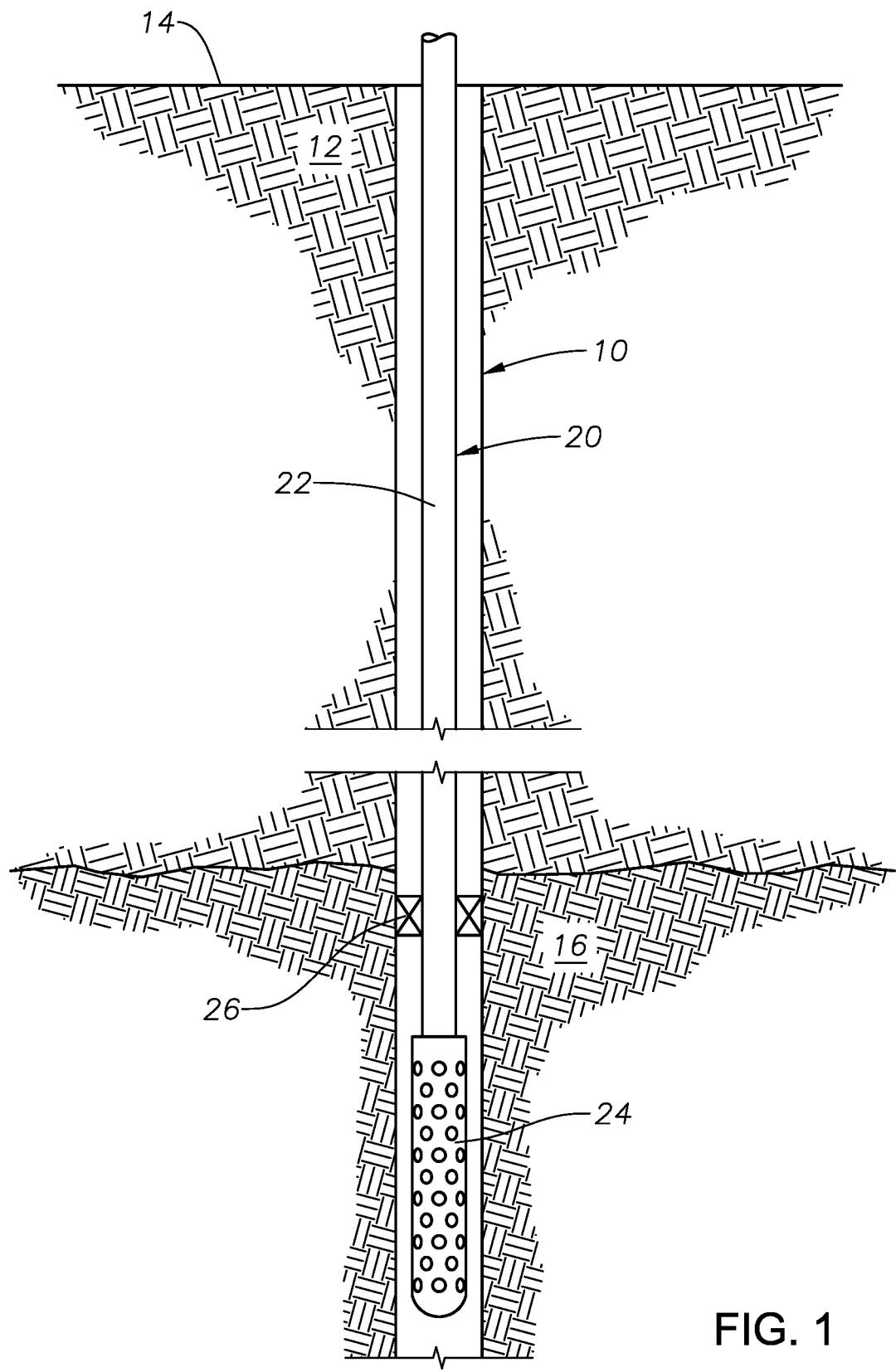
FIG. 1 is a side, cross-sectional view of an exemplary wellbore having a production assembly constructed in accordance with the present invention disposed therein.

FIG. 1 illustrates an exemplary wellbore 10 that has been drilled through the earth 12 from the surface 14 to a hydrocarbon production formation 16. A production assembly 20 is disposed into the wellbore 10. The production assembly 20 includes a running string 22 which may be coiled tubing or conventional pipe sections that are connected in end-to-end fashion. A production nipple 24 is affixed to the distal end of the running string 22. A packer 26 is set within the wellbore 10 above the production nipple 24.

Figure 2:
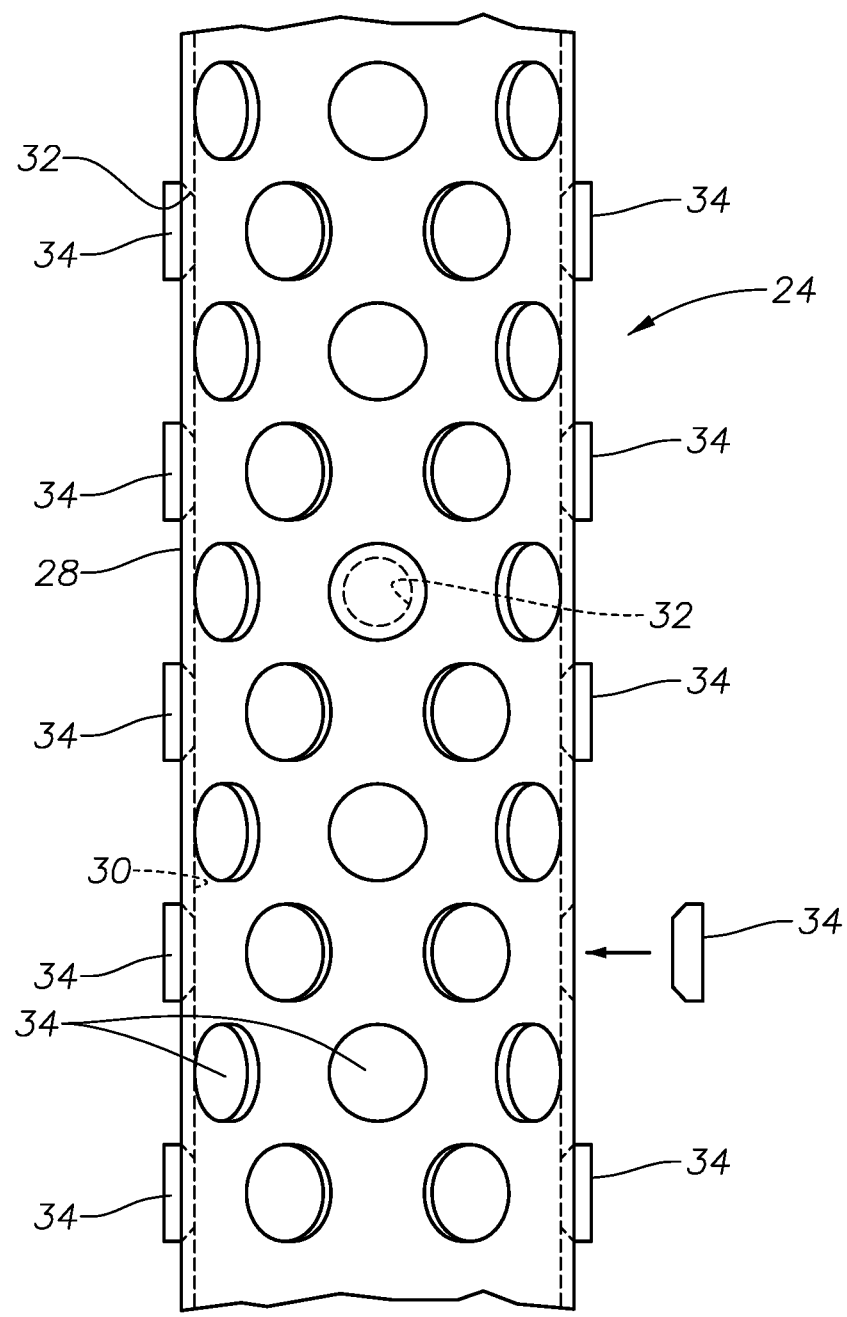
FIG. 2 is an enlarged view of an exemplary production nipple having filtering plugs constructed in accordance with the present invention.
Figure 3:
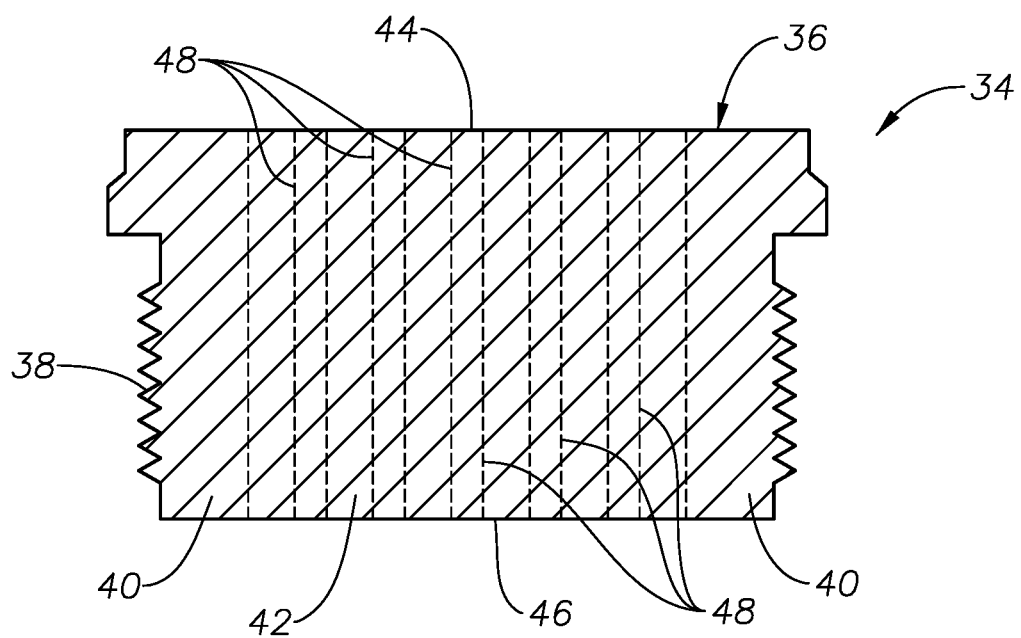
FIG. 3 is a side, cross-sectional view of an exemplary filtering plug constructed in accordance with the present invention.

During operation to produce hydrocarbon fluid, surface pumps (not shown) will draw production fluid from the production formation 16 into production nipple 24 and through running string 22 for transmission to surface 14. The production nipple 24, which is better shown In FIG. 2, includes a generally cylindrical housing 28 which defines an interior chamber 30. When the production nipple 24 is threadedly secured to the running string 22, the interior chamber 30 of the production nipple 24 is in fluid communication with the flowbore of the running string 22.

A plurality of fluid flow openings 32 are disposed through the housing 28. Filtering plugs 34 are secured within each of the openings 32. It is currently preferred that the filtering plugs 34 and fluid flow openings 32 have complementary threading in order to secure the plugs 34 within the openings 32. However, other securing methods, including interference fitting, might be used instead.

FIGS. 3-6 illustrate features of an exemplary filtering plug 34 in greater detail. The plug 34 has a generally cylindrical body 36 with threaded radially outer surface 38. The body 36 preferably has a solid, fluid-impermeable radially outer portion 40 and a radially inner fluid-permeable filtering portion 42. The plug 34 has an inflow end 44 into which formation fluids will enter the plug 34, and an outflow end 46, from which the formation fluids will exit the plug 34. The plug 34 is preferably formed of a strong, rigid, material which is resistant to shear stresses as well as corrosion. In particular embodiments, the plug 34 is formed of stainless steel. It is also preferred that the plug 34 be formed as a unitary piece.

The fluid permeable filtering portion 42 is preferably made up of a plurality of fluid passages 48 which allow fluid to pass through the plug 34 from the inflow end 44 to the outflow end 46 while capturing sand or other debris that is within the fluid. The fluid passages 48 are made up of a plurality of enlarged chambers and connecting channels which extend between neighboring chambers.

Figure 4:
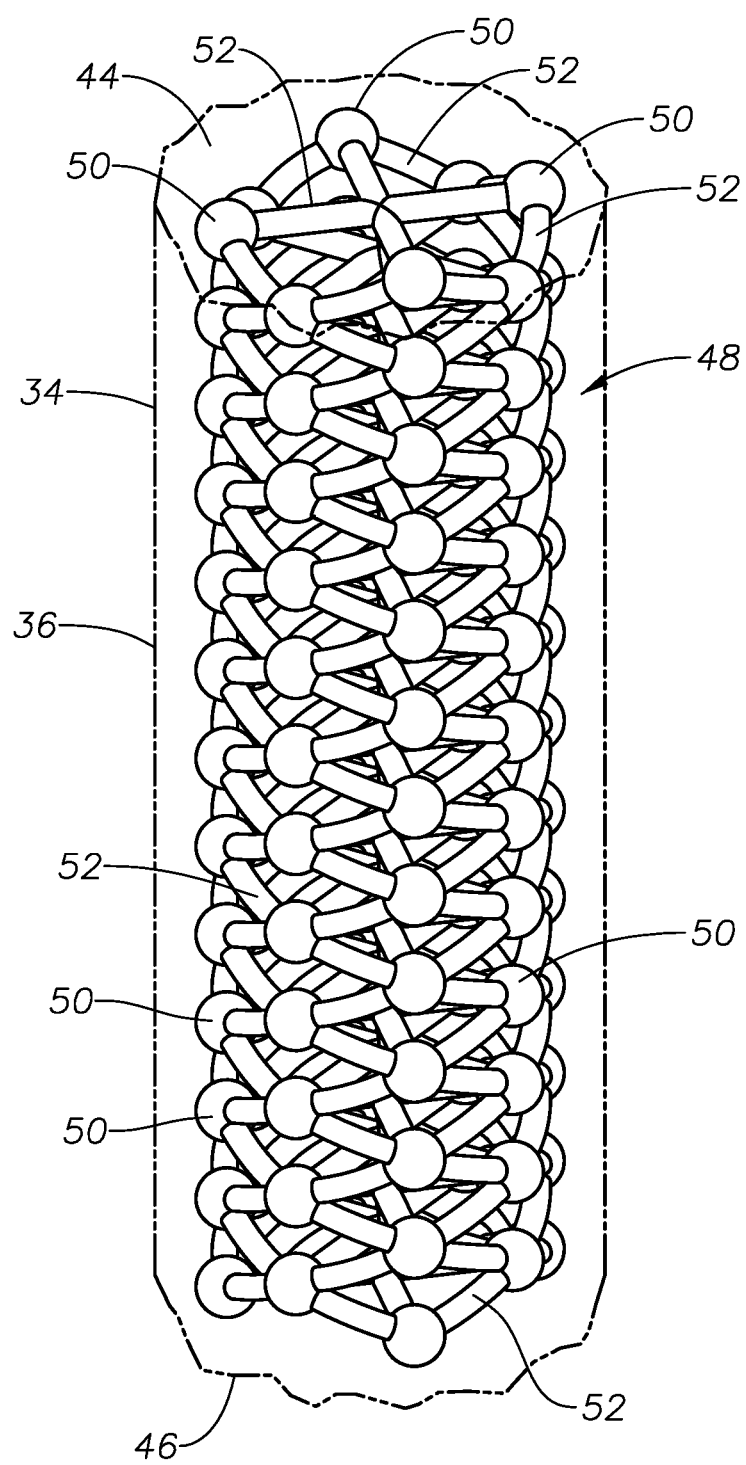
FIG. 4 is a transparent view of a portion of a filtering plug illustrating a single fluid passage through the plug body.
Figure 5:
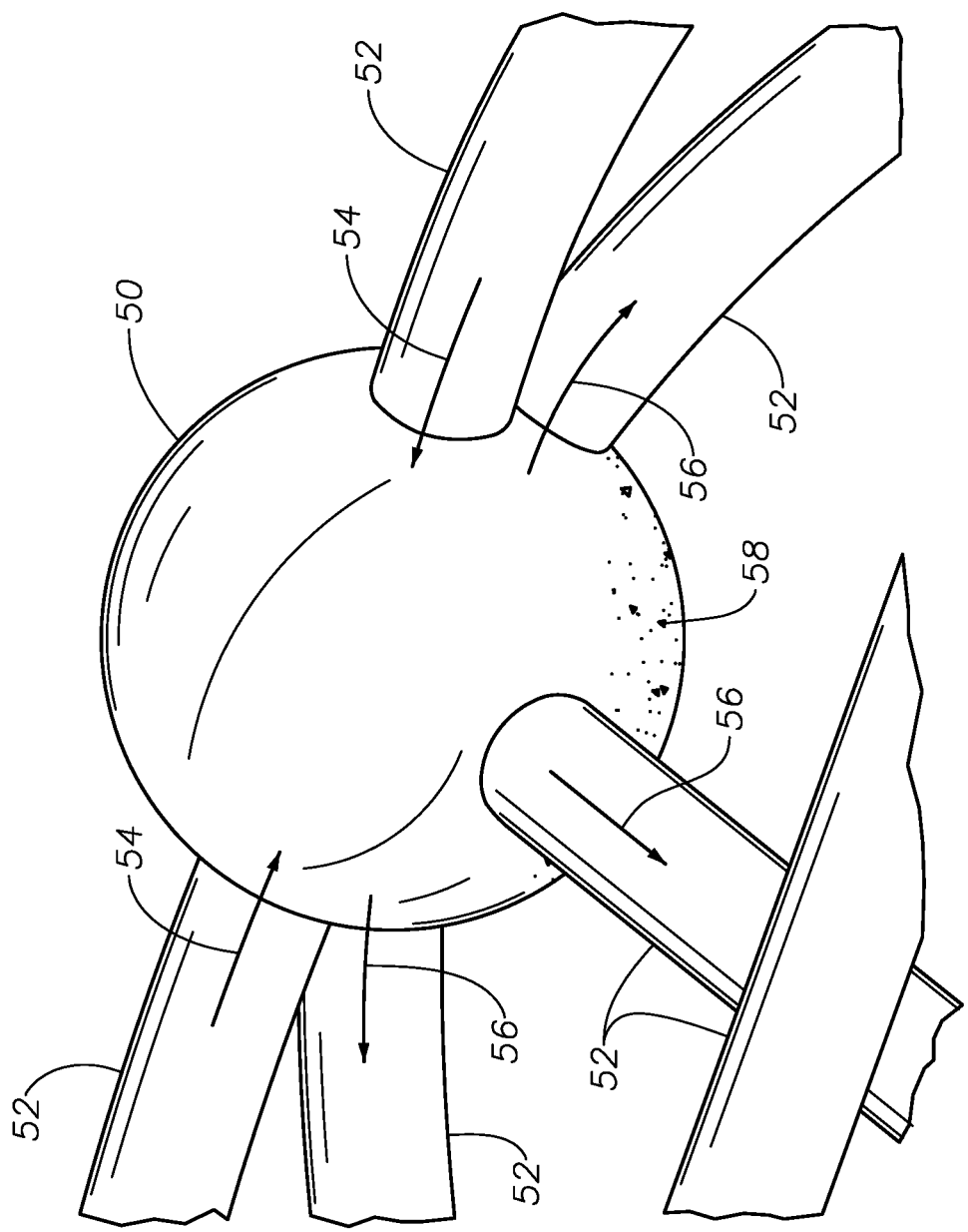
FIG. 5 is an enlarged, transparent view of a single fluid passage chamber.

FIG. 4 illustrates the design for an exemplary fluid passage 48 which is passing through the body 36 of the plug 34. In FIGS. 4-5, the body 36 of the plug 34 is made transparent to more clearly show the structure of the chambers and connecting channels. Chambers 50 are interconnected by reduced diameter connecting channels 52. In preferred embodiments, the chambers 50 are substantially spherical in shape. The connecting channels 52 preferably have a smaller diameter than the diameter of the chambers 50. In currently preferred embodiments, the connecting channels 52 have a diameter that is a fraction of the diameter of the chamber 50. It is currently preferred that each chamber 40 have at least one channel 52 for entry or inflow of fluid and multiple channels 52 for the exit or outflow of fluid. FIG. 5 illustrates fluid flow into and out of a single chamber 50. Fluid flow into the chamber 50 is illustrated by arrows 54. Fluid flow out of the chamber 50 is depicted by arrows 56. As fluid flows into the chamber 50, the fluid pressure will drop due to the enlarged diameter of the chamber 50 with respect to the channel 52. Debris 58 will drop out of the fluid and be retained within the chamber 50. Fluid passing through the fluid passage 48 must pass through multiple chambers 50 and channels 52 thereby trapping a significant amount of debris within the chamber 50.

Figure 10:
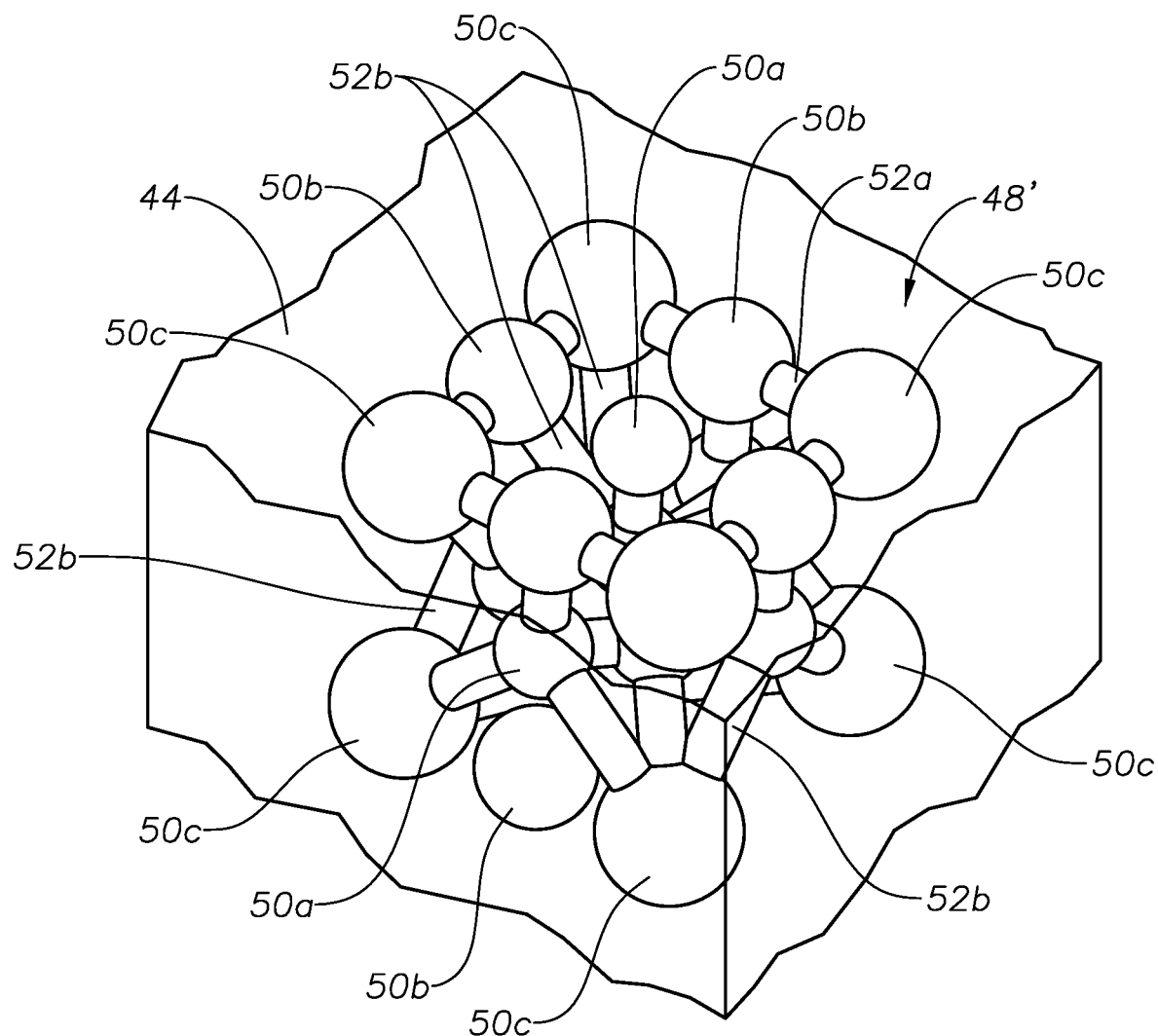
FIG. 10 is a transparent view of an alternative filtering plug fluid passage.

FIG. 10 illustrates a portion of an exemplary fluid passage 48' of alternative construction. It is noted that different chambers 50 within the fluid passage 48' have different chamber diameters. In the depicted arrangement, the fluid passage 48' includes small diameter chambers 50a, medium-sized diameter chambers 50b and large diameter chambers 50c. The medium-sized diameter chambers 50b have a diameter that is greater than the diameter of the small diameter chambers 50a but lesser than the diameter of the large diameter chambers 50c. In addition, many or even all of the connecting channels 52 have different channel diameters from other connecting channels. In the depicted arrangement, there are smaller diameter channels 52a and larger diameter channels 52b. In certain embodiments, the arrangement and sizes of the channels 52 and/or chambers 50 are at least partially or substantially anisotropic. There may be any measure of anisotropy, axially, radially, circumferentially and even random or pseudo-random diameters.

Figure 6:
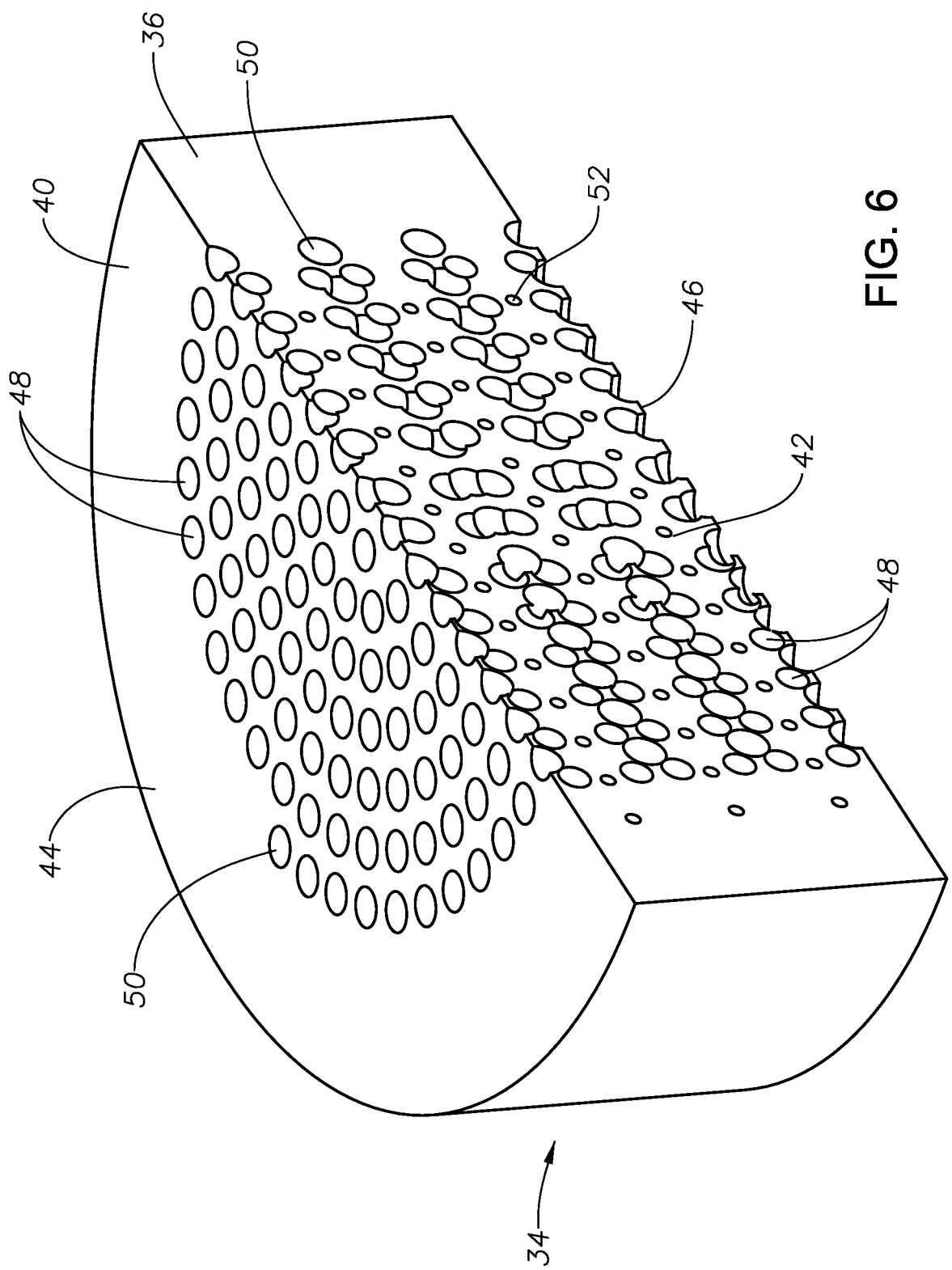
FIG. 6 is an isometric view of a cutaway portion of a filtering plug.

FIG. 6 depicts a cutaway portion of a filtering plug 34 which illustrates a generally helical or spiral pattern of placement of fluid passages 48 within the filtering portion 42 of the plug 34. These patterns can also be seen with reference to FIGS. 8 and 9. However, other patterns might also be used.

Figure 7:
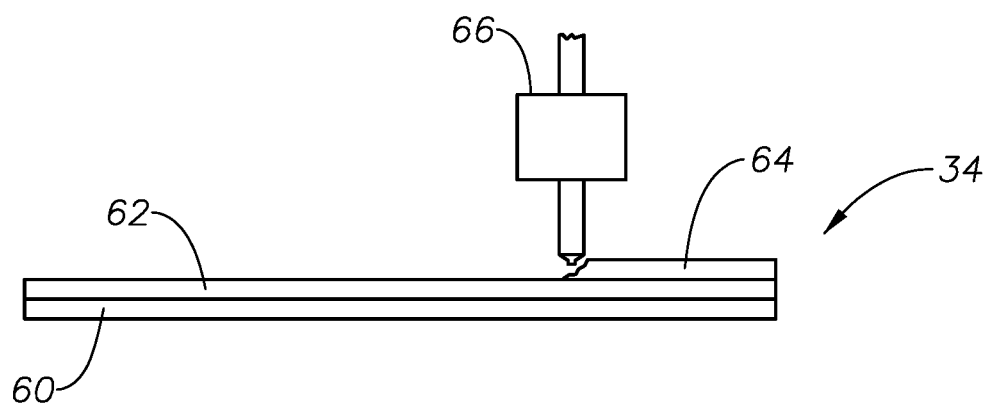
FIG. 7 is a side view depicting exemplary formation of a filtering plug using layered material deposition.
Figure 8:
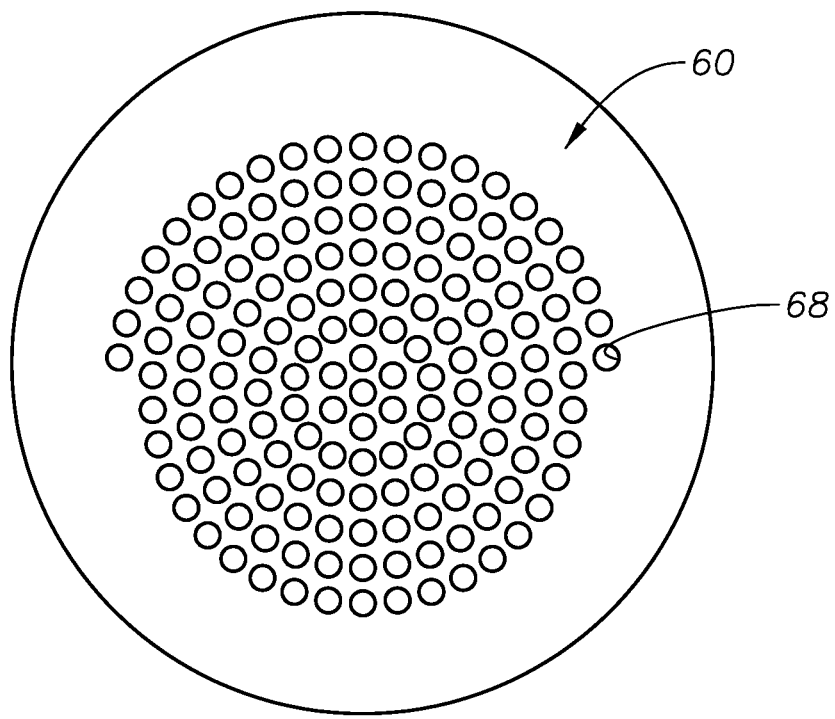
FIG. 8 is a plan view of a first layer of deposited material for forming a filtering plug.
Figure 9:
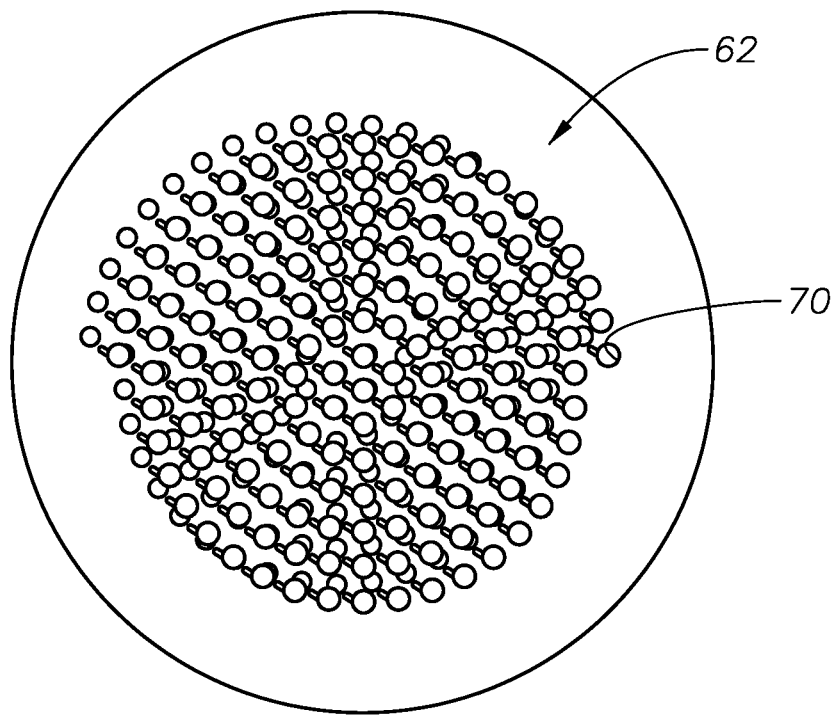
FIG. 9 is a plan view of a second layer of deposited material for forming a filtering plug.

Each filtering plug 34 is preferably formed as a unitary piece. A currently preferred method for creating a filtering plug 34 is to use particle deposition in sequential layers to form a solid matrix. Commercially-available three-dimensional (3D) printers can be programmed to create a printed matrix. Powder bed additive manufacturing techniques are effective to create filtering plug 34. Exemplary technologies that might be used to form a filtering matrix include direct metal laser sintering (DMLS), stereolithography and selective laser sintering. FIGS. 7-9 help illustrate an exemplary process for creating a filtering plug 34 using layers of deposited solid material to create a solid filtering matrix with at least one fluid passage 48 therein that is formed of chambers and connecting passages. FIG. 7 is a side view of a partially created filtering plug 34 which is being created using deposited layers of metal material. Layers 60 and 62 have already been deposited. Layer 64 is in the process of being formed by printing head 66. FIGS. 8 and 9 are plan views depict exemplary layers 60 and 62. It will be appreciated that the layers 60, 62 and subsequent layers define a plurality of openings (i.e., 68, 70) that, when aligned during printing form portions of the fluid passage 48 structure. The inventors have found that use of 3D printing techniques is valuable for accurately forming the intricate designs for fluid passages 48 within a solid material matrix.

It is noted that in accordance with certain aspects of the present invention, one can create a solid filtering matrix in shapes other than a plug or insert for an opening in a production nipple. For example, one might create all or portions of an outer sand screen which would radially surround a production nipple, such as production nipple 24.

Those of skill in the art will recognize that numerous modifications and changes may be made to the exemplary designs and embodiments described herein and that the invention is limited only by the claims that follow and any equivalents thereof.

What is claimed is:

1. A filtering medium for removal of solids from a fluid, the filtering medium comprising:
   a solid filtering matrix which is formed into a filtering plug to be secured within an opening of a production nipple, the plug presenting an inflow end and an outflow end, the solid filtering matrix being formed of a metal material;
   multiple fluid passages defined within the filtering matrix and extending from the inflow end to the outflow end, the fluid passage comprising a plurality of chambers having a first diameter and a connecting channel which interconnects each of the plurality of chambers, the connecting channel having a second diameter which is smaller than the first diameter; and
   the multiple fluid passages are arranged in a helical or spiral pattern starting proximate a center of the filtering plug and radiating outwardly toward an outer circumference of the plug.

2. The filtering medium of claim 1 wherein the chambers are substantially spherical in shape.

3. The filtering medium of claim 1 wherein the solid filtering matrix is formed of multiple deposited layers.

4. The filtering medium of claim 1 wherein the metal material comprises stainless steel.

5. The filtering medium of claim 1 wherein the filtering plug is threaded to allow the plug to be secured within an opening in a production nipple.

6. A filtering medium for removal of solids from a fluid, the filtering medium comprising:
   a solid filtering matrix which is formed into a generally cylindrical filtering plug to be secured within an opening of a production nipple, the plug presenting an inflow end and an outflow end;
   the filtering plug having a fluid impermeable radial outer portion and a radially inner fluid-permeable filtering portion;
   multiple fluid passages defined within the filtering portion and extending from the inflow end to the outflow end, each fluid passage comprising a plurality of chambers having a first diameter and a connecting channel which interconnects each of the plurality of chambers, the connecting channel having a second diameter which is smaller than the first diameter;

the multiple fluid passages are arranged in a helical or spiral pattern starting proximate a center of the filtering plug and radiating outwardly toward an outer circumference of the plug; and the solid filtering matrix being formed of deposited layers of metal material.

7. The filtering medium of claim 6 wherein the metal material comprises stainless steel.

8. The filtering medium of claim 6 wherein multiple fluid passages extend from the fluid inflow end to the fluid outflow end.

9. The filtering medium of claim 6 wherein the chambers are substantially spherical in shape.

10. The filtering medium of claim 6 wherein the filtering plug is threaded to allow the plug to be secured within an opening in a production nipple.

\* \* \* \* \*